United States Patent [19]

Dauwalter

[11] Patent Number: 5,624,218
[45] Date of Patent: Apr. 29, 1997

[54] SAFETY LOCK DEVICE FOR SCREW FASTENERS

[76] Inventor: Charles G. Dauwalter, 13964 Stroud St., Van Nuys, Calif. 91402-6516

[21] Appl. No.: 509,429

[22] Filed: Sep. 12, 1995

[51] Int. Cl.⁶ ............................ F16B 39/00; F16B 39/08; F16B 37/14
[52] U.S. Cl. .................... 411/87; 411/373; 411/429; 411/430; 411/431
[58] Field of Search ........................... 411/8, 14, 87, 411/88, 373, 429, 430, 431, 966; 70/232

[56] References Cited

U.S. PATENT DOCUMENTS

| | | | |
|---|---|---|---|
| 1,195,165 | 8/1916 | Baker | 411/87 |
| 1,379,607 | 5/1921 | Ashley | 411/87 |
| 2,551,834 | 5/1951 | Ferguson | 411/431 |
| 3,135,558 | 6/1964 | Johnston, Jr. et al. | 411/373 |
| 3,548,704 | 12/1970 | Kutryk | 411/373 |
| 4,018,133 | 4/1977 | Chaivre et al. | 411/429 |
| 4,907,929 | 3/1990 | Johnston, Jr. | 411/431 |
| 5,067,750 | 11/1991 | Minneman | 411/431 |
| 5,116,178 | 5/1992 | Lerman et al. | 411/87 |
| 5,350,266 | 9/1994 | Espey et al. | 411/429 |
| 5,468,103 | 11/1995 | Leeson | 411/87 |

FOREIGN PATENT DOCUMENTS 3301527  7/1984  Germany ................. 411/373

*Primary Examiner*—Steven N. Meyers
*Assistant Examiner*—Robert G. Santos
*Attorney, Agent, or Firm*—William H. Maxwell

[57] ABSTRACT

A safety lock device when combined with at least one pair of spaced screw fasteners, which by observation indicates tightness of the fasteners or looseness of either or both fastener, and additionally to limit counter rotation of either fastener to a small faction of a turn, characterized by a pair of replaceable caps anchored to each fastener, and a loose lanyard extending between the caps when the fasteners are in tightened condition, also any multiplicity of caps tethered by lanyards.

29 Claims, 4 Drawing Sheets

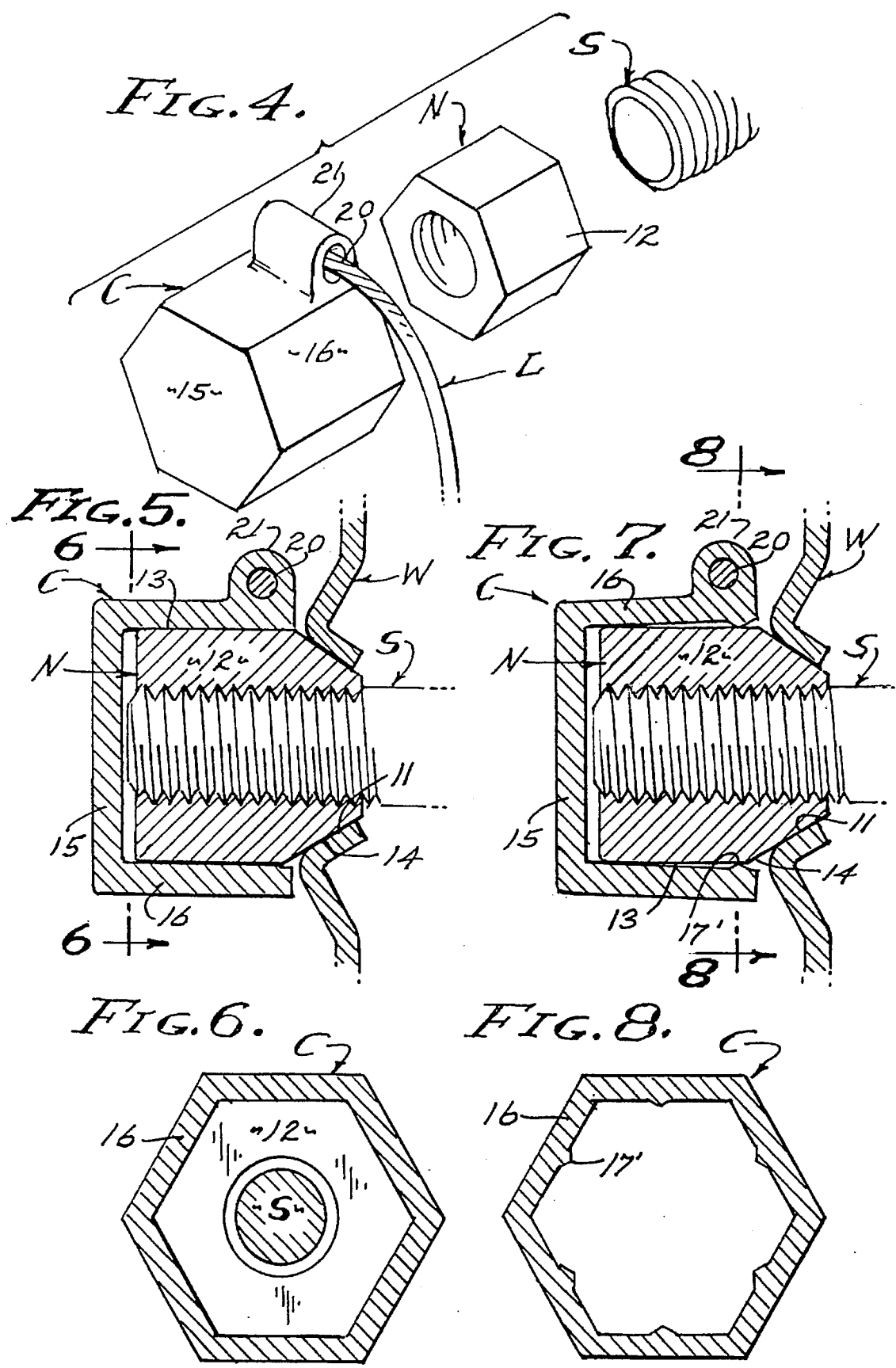

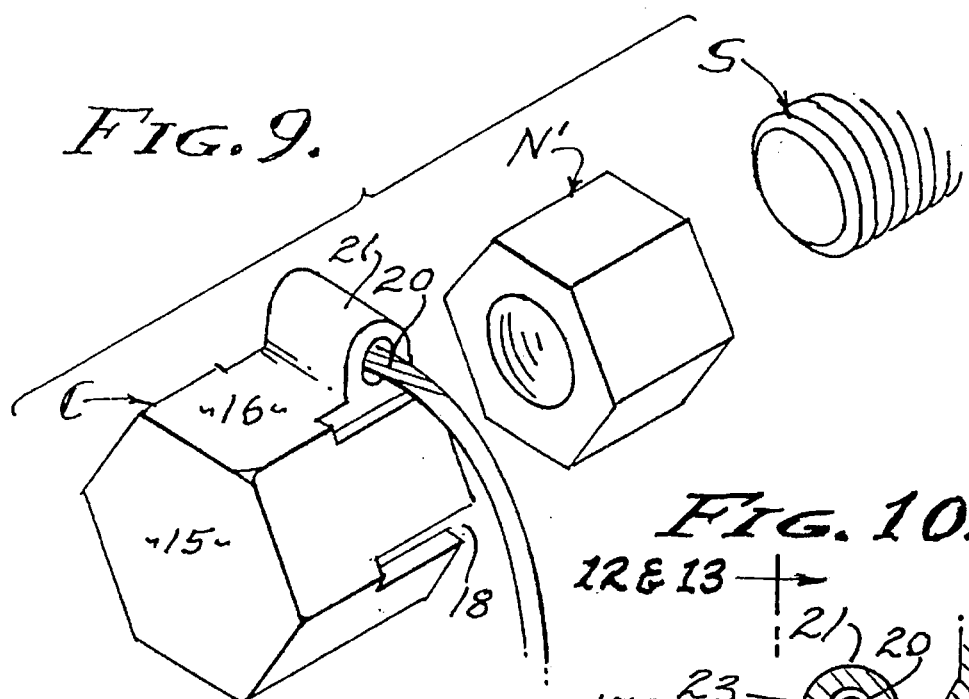
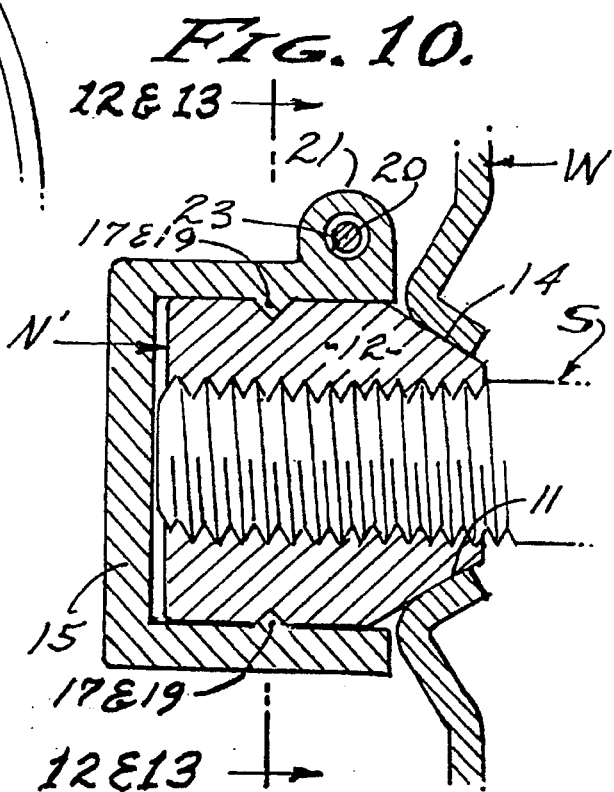
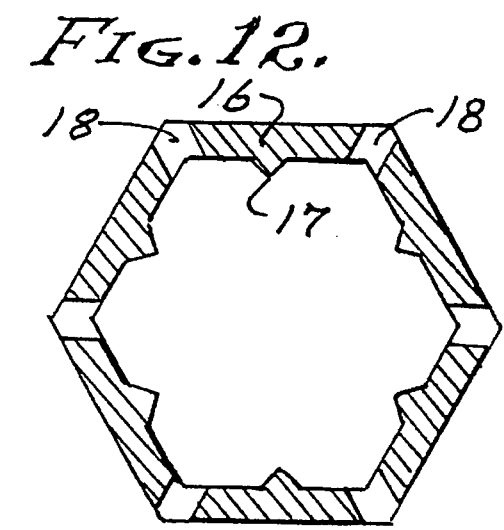
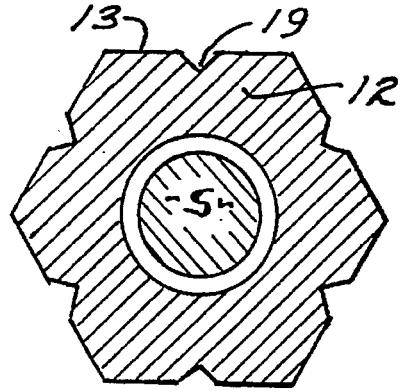

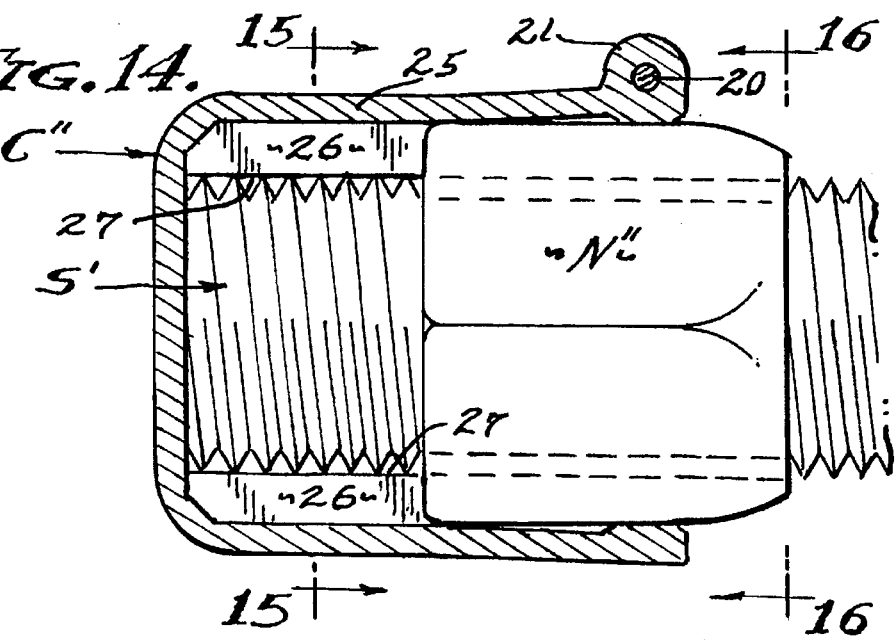
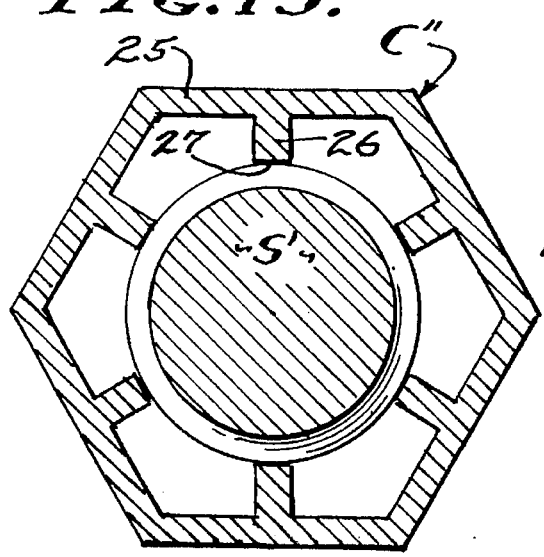
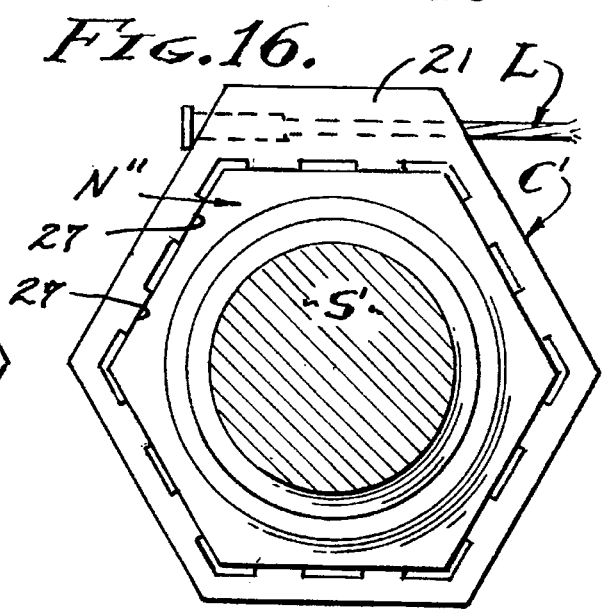
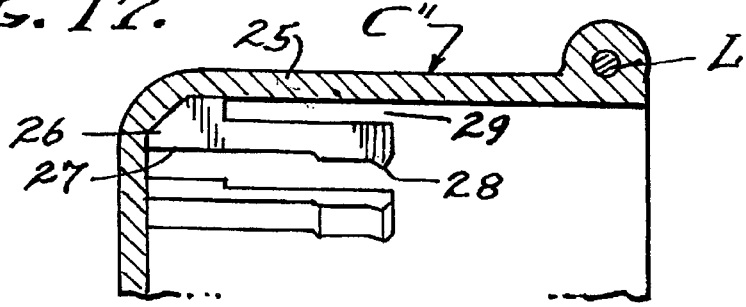

SAFETY LOCK DEVICE FOR SCREW FASTENERS

BACKGROUND OF THE INVENTION

This invention relates to screw fasteners and prevents accidental unscrewing thereof, it being an object of this invention to safety lock the lug-nuts of vehicle wheels. While it may not happen often, loose lug-nuts are a definite safety hazard when coming loose during vehicle travel. Accordingly, most Recreational Vehicle (RV) and travel trailer owner's manuals recommend retightening lug-nuts every two hundred miles or at regular intervals, so as to prevent the hazard of losing a wheel. However, it cannot be presumed that all owners adhere to said recommendation. Therefore, it is an object of this invention to provide a Safety Lock System that reveals loose lug-nuts by simple observations of the safety lock device.

It is to be understood that there is a wide variety of screw fasteners used for a wide variety of purposes, whether they are bolts or nuts, external or internal wrenching, or with slotted or socketed drive features. The characteristic features of a male screw fastener is that the shank or body is threaded to either enter a threaded hole or to receive a nut, and is provided with a head with means to be rotated and torqued. Likewise, the characteristic feature of a female screw fastener is that the body has a threaded bore and is provided with means to be torqued. The usual bolt or nut is threaded right handedly, with various types and quality of threads. A feature of lug-nuts is that they are self locking when properly torqued, but thay do have a propensity to loosen in counter-rotation to their tightening. This loosening factor is counteracted to a great extent in vehicle wheels by employing so-called self locking lug-nuts wherein the interface of the nut and stud opening in the wheel is conical, at approximately 60° (inclusive) which is a locking angle. Nevertheless, vehicle wheels are lost from time to time as a result of loosening lug-nuts.

It is a general object of this invention to prevent one or more nuts or bolts from loosening from their torqued condition, particularly lug-nuts as they are applied to the wheel mounting studs of vehicles. In practice, vehicle wheels are mounted by means of at last four or more studs and lug-nuts applied thereto, it being common practice to employ five such screw fasteners on full sized passenger cars, and for example eight on light trucks, and many more on heavy commercial equipment. In any case, these studs and lug-nuts are cooperatively secured in pairs by the present invention, each lug-nut or bolt being safety locked to prevent counter-rotation more than a very restricted part of a turn. To this end a cap is applied to each fastener or lug-nut with a tie or lanyard there-between, it being an object to prevent counter-rotation of either fastener or lug-nut thereby. A feature of this invention is the tie or lanyard and the manner of securement to each cap, being secured so that each cap is an anchor that prevents counter-rotation of the other, as later described. It is to be understood that either fastener can loosen but a part turn, at which point or position its counter-rotation is stopped. These fasteners are threaded right or left handed.

It is an object of this invention to provide a safety lock device for screw fasteners of the type hereinabove referred to that is reusable. Decorative caps and the like have been applied by means of press fits and various forms of clips and the like, a positive form of such fastener being an object of this invention. Accordingly, resilience of the cap is employed to snap a detent member into a notch provided on the lug-nut per se. In practice, a conventional hexagonal, six faced, external wrenching lug-nut is employed, with a detent notch in each face.

It is also an object of this invention to control and/or stop counter-rotation of either of a pair of multi-faced and preferably hexagonal fastener heads such as lug-nuts. A preferred permissible part turn of loosening is 20° as determined by the lanyard length that limits said rotation while permitting installation of a pair of connected caps to next adjacent fasteners or lug-nuts, regardless of their rotational positions when properly torqued, all of which is described.

It is still another object of this invention to guide a safety lock device in the form of a cap of the type hereinabove referred to, so that it axially aligns with a projecting stud. Commercial and heavy duty wheel constructions involve replaceable stud units characterized by threaded studs that project through and extend beyond the installed position of the lug nuts (see FIG. 14). Thus, the cap of the present invention is elongated to accomodate said stud extension and is subject to misalignment. Accordingly, the cap is provided with guide ribs, and also with thread engageable retainer means.

SUMMARY OF THE INVENTION

The threaded fastener safety lock device is applied to a pair of fasteners or to a series thereof comprised of pairs. In other words, counter rotation of either of the fasteners is controlled by means operating there-between. The safety lock is described herein as applied betwwen a pair of lug-nuts as they are torqued onto the studs of vehicle wheels. This invention features a cap member attached to each of a pair of next adjacent lug-nuts threaded onto studs in a circumferential series to secure a vehicle wheel to a hub or brake drum or the like. In accordance with this invention, there is a tie or lanyard that emanates clockwise from one cap and counterclockwise from the other cap. The length of the tie or lanyard controls the degree that either one or both caps may counter-rotate. A feature is the angularly displaced location of attachment of the lanyard to said pair of caps, shown to what will be termed a top side of one cap and a bottom side of the other cap. Therefore, either cap tensions the lanyard when turned counterclockwise if loosened, to be stopped when the lanyard becomes taut.

It is significant that the top side of one atachment is rotatably displaced from the other attachment of the lanyard, and the length of the lanyard being or preferably loose when installed. Counter-rotation of either cap pulls the lanyard taut so as stop loosening of either lug-nut. In practice, the length of the lanyard is such as to limit either nut to 20° counter-rotation, or both to 10°, at which degree of rotation the lug-nut is partially loosened but remaining effectively in place so as to prevent wheel loss. A feature is that a loose condition is detected by inspection to determine whether any lanyard is taut. Means for attachment is provided in the form of a slidable press fit, a force fit of an interference projecton, a ratchet, or a thread engageable retainment means, all of which are employed singly or jointly.

The foregoing and various other objects and features of this invention will be apparent and fully understood from the following detailed description of the typical preferred forms and applications thereof, throughout which description reference is made to the accompanying drawings.

THE DRAWINGS

FIG. 4 is an exploded view illustrating the safety cap, lug-nut and wheel stud relationship.

FIG. 5 is an enlarged detailed longitudinal sectional view illustrating a lug-nut to vehicle wheel stud installation with the safety cap of FIG. 4 installed thereon.

FIG. 6 is an detailed sectional view illustrating the anchor fitting taken as indicated by line 6—6 on FIG. 5.

FIG. 7 is a second embodiment similar to FIG. 5, illustrating an enhanced force fit attachment of the safety cap.

FIG. 8 is a detailed sectional view similar to FIG. 6 and taken as indicated by line 8—8 on FIG. 7 and, illustrating the safety cap of FIG. 7 as it appears removed from the lug-nut.

FIG. 9 is an exploded view illustrating a third embodiment in the form of a snap-on safety cap, lug-nut and wheel stud relationship.

FIG. 10 is an enlarged detailed longitudinal sectional view illustrating a lug-nut to vehicle wheel stud installation with the safety cap of the FIG. 9 embodiment installed thereon.

FIG. 11 is an enlarged detailed sectional view illustrating the anchor fitting as applied to each end of the lanyard.

FIGS. 12 and 13 are enlarged detailed sectional views of the safety cap and lug-nut respectively and taken as indicated by section line 12 & 13—12 & 13 on FIG. 10, illustrating a preferred detent feature to attach the cap to the lug-nut.

FIG. 14 is an enlarged detailed sectional view similar to FIGS. 4, 7 and 10, illustrating a commercial heavy duty embodiment wherein the threaded stud extends and is accomodated within guide ribs of the cap.

FIGS. 15 and 16 are sectional views taken as indicated by lines 15 and 16 on FIG. 14. And, FIG. 17 illustrates the thread engageable retainment means. applied to the guide ribs of FIGS. 14 and 15

PREFERRED EMBODIMENT

Figure 1:
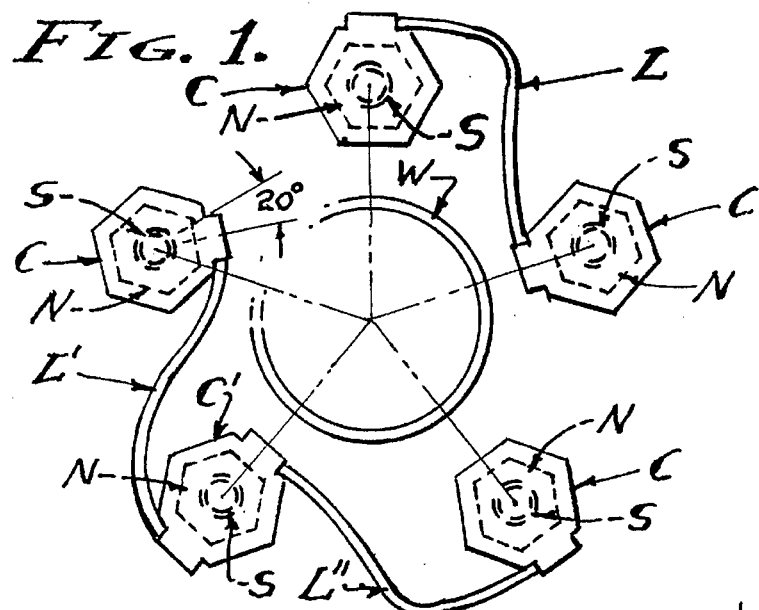
FIG. 1 is an elevation view illustrating a stud circle of five vehicle wheel studs surrounding a hub. Sets of Safety Lock Devices are installed over lug-nuts that are torqued in their random rotative positons.
Figure 3:
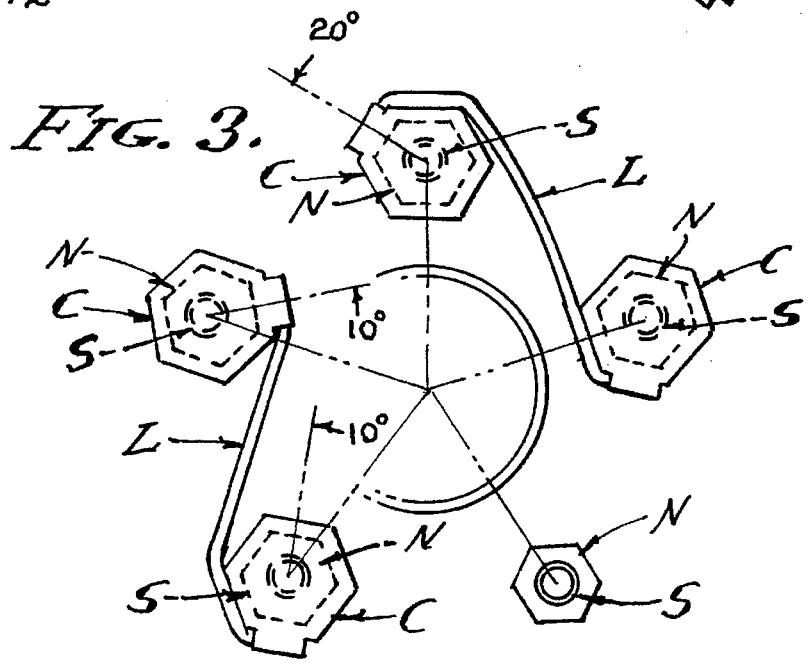
FIG. 3 is a view similar to FIG. 1, illustrating two sets of Safety Lock Devices wherein one or the other of a pair of lug-nuts of each pair is loose.

Referring now to the drawings, a wheel stud circle of five studs S and safety locked lug-nuts is shown in FIG. 1, and one unlocked lug-nut in FIG. 3. It will be observed that caps C are engaged over the lug-nuts N, with a lanyard L extending between next adjacent caps. A feature of this invention is that the lanyard L is anchored to the top periphery of one cap C and to the bottom periphery of the other cap C, of each pair of caps. Accordingly, the loosening of either lug-nut N and one cap C in a counter rotative direction is limited by anchored attachment of the lanyard L to the other cap C. Consider therefore the comparative illustrations of FIGS. 1 and 3; FIG. 1 showing loose lanyards L extending between pairs of caps C, and FIG. 3 showing substantially taut lanyards L extending between pairs of caps C. A loose lanyard L extending between a pair of caps C indicates that those attached lug-nuts remain torqued or tightened and have not loosened. Whereas, a taut lanyard L extending between a pair of caps C indicates a loose lug-nut, one or the other of a pair at either end of the lanyard L.

The most widely used and universal lug-nut is of hexagonal configuration wherein each flat side occupies 60° if its periphery. Therefore, the maximum increment of loosening from face to face is 60°, one of said faces carrying an anchor lug 21 later described. However, it is preferred to limit loosening to 20°, as shown and described.

FIG. 1 illustrates two embodiments of the Safety Lock Device, one wherein a single lanyard L extends between a pair of caps C, and the other wherein a series of three caps C are joined by two lanyards L, with the intermediate cap C common to two pairs of said caps C (three in all). Note that the lanyard L is anchored to the top periphery of the left cap C and to the bottom of the right cap C; the lug-nuts N having right handed threads subject to counterclockwise loosening. As shown in FIG. 1, the lug-nuts N and caps C are in torqued positions, each subject to 20° counter rotation so as to substantially tighten the lanyard L.

Figure 2:
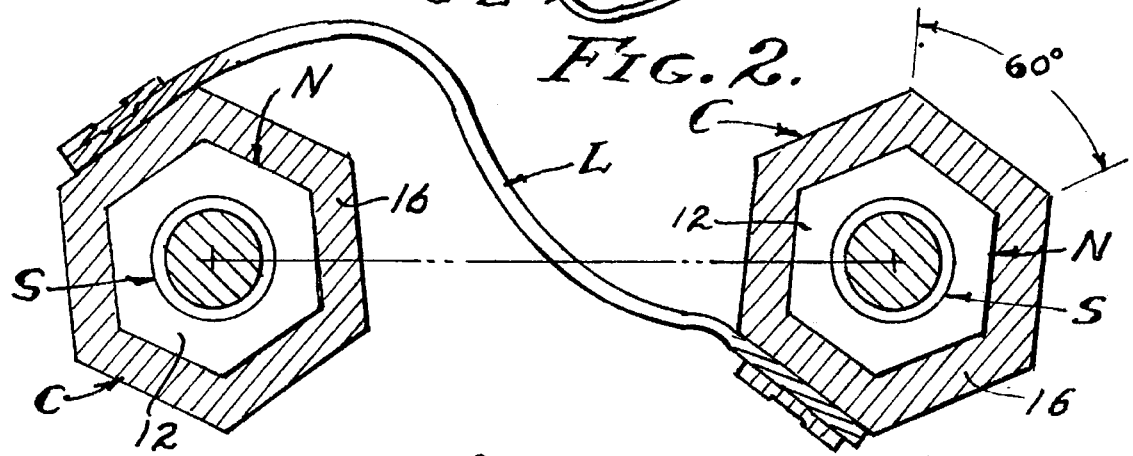
FIG. 2 is an enlarged sectional view of a pair of spaced nuts threaded onto screw fasteners with the lanyard of the present invention in an extreme loose condition, indicating that the nuts are tight.

FIG. 2 illustrates an extreme loose condition of the lanyard L wherein a lanyard of excessive length is loose between a cap C to the left in a torqued position 20° counterclockwise from top dead center, and a cap C to the right in a torqued position 20° clockwise from bottom dead center.

FIG. 3 illustrates two loosened lug-nut conditions. One pair of lug-nuts N and caps C is subject to the left nut and cap loosening 20° counterclockwise, in which case the lanyard L becomes taut as it is anchored to the right nut and cap which is thereby prevented from loosening. The other pair of lug-nuts N and caps C is shown subject to the remote condition wherein both the left and right nuts and caps loosen 10° counterclockwise, in which case the lanyard L becomes taut or substantially so as shown. It is to be understood that the degree of counter rotation will vary depending upon how much and which lug-nut loosens.

Referring now to the basic means of attachment of cap C to the lug-nut N threaded and torqued onto a stud S, see FIG. 5 of the drawings. The vehicle wheel W is shown having a stud receiving opening surrounded by a tapered seat 11 disposed at a 60° locking angle. The lug-nut N is of the common external wrenching type characterized by a solid hexagonal body 12 having six drive facets 13 and a tapered locking face 14 to engage with the aforesaid seat 11 at said 60° locking angle. Properly torqued lug-nuts N for wheel attachment is considered to be self locking, but such an attachment is known to loosen frequently. Therefore, it is an object of this invention to provide a secure attachment of the caps C to pairs of lug-nuts N and joined by a lanyard L to limit loosening of said lug-nuts and to indicate looseness when it occurs. To this end, press-on means is provided to attach the caps C in selective operative positions on the lug-nuts N. It is to be understood that any means of attachment can be employed as circumstances require, for example by means of reusable fasteners or expendable fasteners, such as pins, screws, cotters, wires etc. Therefore, the caps C are press fitted as shown in FIGS. 5 and 6, or they are force fitted as shown in FIGS. 7, 8 and 14 or they are held with a detent attachment as shown in FIGS. 10, 11 and 12.

In accordance with this invention, the cap C is rotatably coupled to the lug-nut N by virtue of its attachment thereto, so that rotation of the lug-nut N is directly transferred to the cap C. To this end, cap C is characterized by a polygonal cavity complementary to the hexagonal exterior of the lug-nut N. In the Embodiment of FIGS. 4–6, the hexagonal interior of the cap C is slidably press fitted over the exterior of the lug-nut N. Accordingly, the cap C has six selective rotational positions of attachment when being installed onto a lug-nut N, said positions being rotatably displaced 60° by selection.

The cap C as it is disclosed herein is a shell of rigid material having a degree of resilience and comprised of a flat top 15 to overlie a stud S and lug-nut N threaded thereon, with depending skirt walls 16; six walls 16 in all when accommodating a hexagonal nut. The wall thickness of the top 15 and skirt walls 16 is uniform and is selected according to the properties of the material used, in order to predetermine the press fit, force fit or detent pressure to be applied inwardly at each facet 13 at the inner face of each wall 16. In practice, the shell of cap C is injection molded of Acylic-Butyl-Styrene (ABS) plastic which has the properties required and which is durable. The walls 16 may be integrally joined when material resilience permits sufficient deflection of said walls. In the embodiment of FIGS. 9–13, it is preferred to separate the six skirt walls 16 by means of slots 18 at each corner of the hexagonal configuration of the cap C, whereby each wall 16 and its detent projection 17 is independently retracted from a detent notch 19 in each drive facet 13 of the lug-nut N'. The detent notches 19 and projections 17 are centrally located mating female and male conical formations on the facets 13 and skirt walls 16 respectively as shown. Accordingly, the caps C are forceably attached to and detached from the lug-nuts by applying axial lifting pressure to said caps C.

Referring now to the lanyard L and its opposite terminal end anchors to the top and bottom peripheries of next adjacent caps C, counterclockwise loosening of one lug-nut N and cap C is limited or controlled by the tight condition of the other cap C of an attached pair of caps which establishes the Safety Lock Device of the present invention. In other words, counterclockwise rotation of one cap C is opposed by clockwise positioning of the other cap C (whether unmoved or slightly loosened) and vice versa.

It is the periphery of the caps C to which the opposite terminal end portions 20 of the lanyard L are anchored through a lug 21 integral with a skirt wall 16. In practice, the lanyard is a length of flexible metal cable or the like with each of its terminal end portions 20 extended into and through a tangentially disposed opening 23 through said lug. As shown in FIG. 11 the terminal end portion 20 of the lanyard is anchored by a flanged ferrule 24 secured as by swedging (see FIG. 11). The length of the lanyard L and position of the ferrules 24 is determined by installing a taut lanyard L between a pair of mounted caps C with the top anchor lug 21 of one cap C rotatably displaced 20° counterclockwise with respect to the rotational position of the other cap C. In other words, the counter rotative position of the anchor at one end of the lanyard L is approximately 180° from the other anchor at the other end of the lanyard. The degree of angular separation can vary widely within reason.

A characteristic feature of this invention is that the caps C are employed in pairs that are attached to next adjacent lug-nuts N, as clearly shown in FIGS. 1, 2 and 3. However, this is not to preclude a series of three (or more) caps C as shown for example in FIG. 1. When in a series of three or more caps, one of said caps is common to two pairs of caps, in which case the common cap C' has diametrically opposite anchor lugs 21 with two lanyards L' and L" extending oppositely therefrom. As shown in FIG. 1, one lanyard L' extends clockwise from the bottom periphery of the cap C', while the other lanyard L" extends clockwise from the top periphery of the cap C'. Lanyard L' then anchors counterclockwise into the top periphery of a next adjacent cap C, while the other lanyard L" then anchors counterclockwise into the bottom periphery of a next adjacent cap C. A most practical arrangement of a series of caps is three caps as shown. Accordingly, a set of three plus a set of two caps accommodates a lug-nut circle of five, and two sets of two caps accomodates a circle of four, etc., thereby accomodating any even or odd number of fasteners in series.

Referring to the force fit cap embodiment of FIGS. 4, 7 and 8, the skirt walls 16 are the same, as in the first described embodiment of FIGS. 4–6, so as to slidably engage with the facets 13 of the lug-nut N. Additionally and in order to ensure a force fit, one or more and preferably each internal face of the skirt walls 16 is provided with an interference projection 17' to frictionally engage the lug-nut. Deflection of the skirt walls 16 is illustrated (exaggerated) in FIG. 7, the interference projections 17' being relatively shallow obstructions.

Referring now to the heavy duty type of replaceable lug-nut and stud assembly as used on commercial vehicles and the like, as shown in FIGS. 14–17, the threaded stud S' extends outward from the nut N" and is housed within an extension 25 of the cap C". A stabilizing feature is the provision of circumferentially spaced ribs 26 that extend longitudinally and preferably at each face of the polygonal cap configuration. As shown, the ribs 26 project inwardly and present rails 27 slideable on the outside diameter of the stud threads, thereby guiding the cap C" coaxially onto the stud S'.

Retainment means in the form of spaced interfering flats 27 are provided at the open inner end of the cap C", to be force fitted over the nut N". In practice, there is a pair of circumferentially spaced flats 27 at the rear inner edge of each flat-side of the cap C" (see FIG. 16).

Referring now to FIG. 17, a thread engageable interference projection 28 is provided on one or more of the guide ribs 26, to have a ratchet effect with the stud threads. As is clearly shown in FIG. 14, the walls of the cap C" are deflected by engagement of the flats 27 over the nut N", there being a slot 29 that separates the rib from the wall of the cap in order to permit said deflection and for disengagement.

From the foregoing it will be apparent that I have provided a pair of caps for attachment to circumferentially spaced next adjacent lug-nuts, and a flexible lanyard extended between the two caps from the peripheries thereof and in opposite directions of pull in tension against counter-rotation of either of said two caps. The lanyard lengths can be pre-cut and the ferrules installed, or they can be customized to each installation, the lanyard being of a length to be loose when the caps are snapped onto properly torqued (tightened) screw fasteners, in which case the lanyard will become taut when either or both screw fasteners are in a loose condition. It is significant that the screw fasteners are captured by a taut lanyard that stops counter rotation of either or both screwfasteners, so that they are prevented from un-screwing from the previously tightened condition thereof.

Having described only the preferred forms and applications of my invention, I do not wish to be limited or restricted to the specific details herein set forth, but wish to reserve to myself any modifications or variations that may appear to those skilled in the art as set forth within the limits of the following claims.

I claim:

1. In combination with screw fasteners threaded to screw members, a safety lock device for indicating looseness of a screw fastener and for stopping counter rotation of said screw fasteners from a tightened condition thereof, and including;

a pair of two like next adjacent screw fasteners threaded to a pair of said screw members spaced a fixed distance, a pair of two caps carried by and each with means for attachment to one of said pair of like next adjacent screw fastener threaded to said member for the caps to rotate therewith respectively, and a flexible lanyard extending between the two caps and secured by anchor means to extend from the peripheries of said two caps in directions of pull in tension against counter rotation of either of said two caps, the lanyard being longer than the distance between the anchor means of said two caps so as to be loose between said pair of two caps for indicating when the screw fasteners are in tightened conditions, and to be taut bewteen said pair of two caps for indicating that either or both screw fasteners are in a loose condition, and for limiting either or both screw fasteners to a part turn only in counter rotation.

2. The combination of screw fasteners threaded to a member and a safety lock device as set forth in claim 1, wherein the caps are polygonal with depending side walls for slidably engaging drive facets on the screw fastener.

3. The combination of screw fasteners threaded to a member and a safety lock device as set forth in claim 1, wherein the means for attachment is a slidable press fit engageable between the cap and a head of the screw fastener.

4. The combination of screw fasteners threaded to a member and a safety lock device as set forth in claim 1, wherein the means for attachment is a slidable force fit of an interference projection between the cap and a head of the screw fastener.

5. The combination of screw fasteners threaded to a member and a safety lock device as set forth in claim 1, wherein the means for attachment is a detent engageable between the cap and a head of the screw fastener.

6. The combination of screw fasteners threaded to a member and a safety lock device as set forth in claim 1, wherein the caps are comprised of a top for overlying the screw fastener with a wall depending therefrom for interfaced sliding engagement with a side of said screw fastener, the means for attachment being engageable between said wall and said side of the screw fastener.

7. The combination of screw fasteners threaded to a member and a sefety lock device as set forth forth in claim 1, wherein the caps are polygonal and comprised of a top overlying the screw fastener and with a multiplicity of walls depending therefrom for interfaced sliding engagement with complementary drive facets on the sides of the screw fasteners, the means for attachment being a detent engageable between each of said multiplicity of walls and said complementary drive facets on the screw fastener.

8. The combination of screw fasteners threaded to a member and a safety lock device as set forth in claim 7, wherein the multiplicity of walls are separated by slots for deflection to engage and to disengage the detent.

9. The combination of screw fasteners threaded to a member and a safety lock device as set forth in claim 1, wherein the anchor means securing the lanyard to each cap is a tangential opening at the periphery of the cap, an end portion of the lanyard being affixed thereto.

10. The combination of screw fasteners threaded to a member and a safety lock device as set forth in claim 1, wherein the anchor means securing the lanyard to each cap is a tangential opening at the periphery of the cap, an end portion of the oanyard extending through the opening with a ferrule affixed thereto and engaged with the cap to position the lanyard against counter rotation.

11. The combination of screw fasteners threaded to a member and a safety lock device as set forth in claim 1, wherein the safety lock device is comprised of at least two pairs of caps joined in a series by said lanyard extending therebetween.

12. The combination of screw fasteners threaded to a member and a safety lock device as set forth in claim 1, wherein the safety lock device is comprised of three caps joined in a series and each by said lanyard extending therebetween, one cap being common to each pair of caps.

13. In combination with lug-nuts threaded to wheel studs, a safety lock device for indicating looseness of a lug-nut threaded onto a wheel stud and for stopping counter rotation of lug-nuts from a tightened condition thereof, and including;

a pair of two like next adjacent lug-nuts threaded onto a pair of studs spaced at a fixed distance, a pair of two caps carried by and each with means for attachment to one of said pair of like next adjacent lug-nuts on said pair of studs for the caps to rotate therewith respectively, and a flexible lanyard extending between the two caps and secured by anchor means to extend from the peripheries of said two caps in directions of pull in tension against counter rotation of either of said two caps, the lanyard being longer than the distance between the anchor means at said two caps so as to be loose between said pair of two caps for indicating that the lug-nuts are in tightened conditions, and to be taut between said pair of two caps for indicating that either or both lug-nuts are in a loose condition, and for limiting either or both lug-nuts to a part turn only in counter rotation.

14. The combination of lug-nuts and wheel studs and a safety lock device as set forth in claim 13, wherein the caps are polygonal with depending side walls for slidably engaging drive facets on the lug-nuts.

15. The combination of lug-nuts and wheel studs and a safety lock device as set forth in claim 13, wherein the means for attachment is a slidable press fit engageable between the cap and a drive facet of the lug-nut.

16. The combination of lug-nuts and wheel studs and a safety lock device as set forth in claim 13, wherein the means for attachment is a slidable force fit of an interference projection engageable between the cap and a drive facet of the lug-nut.

17. The combination of lug-nuts and wheel studs and a safety lock device as set forth in claim 13, wherein the means for attachment is a detent engageable between the cap and a drive facet of the lug-nut.

18. The combination of lug-nuts and wheel studs and a safety lock device as set forth in claim 13, wherein the cap is comprised of a top for overlying the lug-nut with walls depending therefrom for interfaced sliding engagement with side facets of said lug-nut, the means for attachment being a detent engageable between said walls and said side facets of the lug-nut.

19. The combination of lug-nuts and wheel studs and a safety lock device as set forth in claim 13, wherein the cap is polygonal and comprised of a top overlying the lug-nut and with a multiplicity of walls depending therefrom for interfaced sliding engagement with complementary drive facets on the sides of the lug-nuts, the means for attachment being a detent engageable between each of said multiplicity of walls and said complementary drive facets on the lug-nut.

20. The combination of lug-nuts and wheel studs and a safety lock device as set forth in claim 19, wherein the multiplicity of walls are separated by slots for deflection to engage and to disengage the detent means.

21. The combination of lug-nuts and wheel studs and a safety lock device as set forth in claim 13, wherein the anchor means securing the lanyard to each cap is a tangential opening at the periphery of the cap, and an end portion of the lanyard being affixed thereto.

22. The combination of lug-nuts and wheel studs and a safety lock device as set forth in claim 13, wherein the anchor means securing the lanyard to each cap is a tangential opening at the periphery of the cap, and an end portion of the lanyard extending through the opening with a ferrule affixed thereto and engaged with the cap to position the lanyard against counter rotation.

23. The combination of lug-nuts and wheel studs and a safety lock device as set forth in claim 13, wherein the safety lock device is comprised of at least two pairs of caps joined in a series by said lanyards extending therefrom.

24. The combination of lug-nuts and wheel studs and a safety lock device as set forth in claim 13, wherein the safety lock device is comprised of three caps joined in a series by lanyards extending therebetween and one cap being common to each pair of caps.

25. The combination of lug-nuts and wheel studs and a safety lock device as set forth in claim 13, wherein the means for attachment is at least one flat interference projection at the open end of the cap for interfaced slidable force fit engagement with a facet of the nut.

26. In combination with threaded nuts and studs, a safety lock device for indicating looseness of a nut threaded onto a stud and for stopping counter rotation of said nut from a tightened condition on said stud, and including;

a pair of two like next adjacent threaded nuts threaded onto a pair of studs spaced at a fixed distance, a pair of two caps carried by and each with mans for coaxially aligned attachment to one of said pair of like next adjacent threaded nuts on said pair of studs for the caps to rotate therewith, and a flexible lanyard extending between the two caps and secured by anchor means to extend from the peripheries of said two caps in directions to pull in tension against counter rotation of either of said two caps, the lanyard being longer than the distance between the anchor means at said two caps so as to be loose between said pair of two caps for indicating that the nuts are in tightened conditions, and to be taut between the two caps for indicating that either or both nuts are in a loose condition, and for limiting either or both nuts to a part turn only in counter rotation.

27. The combination of threaded nuts and studs and a safety lock device as set forth in claim 26, wherein the means for coaxially aligned attachment includes guides slidably engageable with a threaded portion of the stud extending from the nut.

28. The combinaton of threaded nuts and studs and a safety lock device as set forth in claim 26, wherein the means for coaxially aligned attachment includes at least one guide rib slidably engageable with a threaded portion of the stud extending from the nut, there being an interference projection carried by the guide rib for ratchet engagement with said threaded portion of the stud.

29. The combination of threaded nuts and studs and a safety lock device as set forth in claim 28, wherein the guide rib is slotted with a portion thereof extended longitudinally to flexibly carry said interference projection for disengageable thread engagement.

* * * * *